United States Patent [19]

Borrione et al.

[11] Patent Number: 5,006,215

[45] Date of Patent: Apr. 9, 1991

[54] SQUEEZER APPARATUS

[75] Inventors: Pierluigi A. Borrione, Milan; Vittorio Caizzi, Crema; Maurizio Marzupio, Capriate San Gervasio; Jean E. Morris, Segrate-Milan, all of Italy

[73] Assignees: The Dow Company, Midland, Mich.; DeNora Permelec S.p.A., Milan, Italy

[21] Appl. No.: 386,875

[22] Filed: Jul. 27, 1989

[51] Int. Cl.⁵ .................. C25B 9/00; C25B 13/00; B01D 25/00

[52] U.S. Cl. .................. 204/253; 204/267; 204/279; 210/228; 210/230; 210/231

[58] Field of Search .................. 204/279, 253–258, 204/267; 210/227–231

[56] References Cited

U.S. PATENT DOCUMENTS

| | | | |
|---|---|---|---|
| 1,273,357 | 7/1918 | Gougnard | 204/256 |
| 2,173,793 | 1/1939 | Niederreither | 204/254 |
| 2,881,123 | 4/1959 | Zdansky | 204/256 |
| 3,331,511 | 7/1967 | Kurita | 210/230 |
| 3,807,567 | 4/1974 | Iwatani | 210/225 |
| 3,875,040 | 4/1975 | Weltin et al. | 204/267 |
| 3,898,149 | 8/1975 | Kircher et al. | 204/252 |
| 3,926,770 | 12/1975 | Hoekje | 204/256 |
| 4,017,375 | 4/1977 | Pohto | 204/255 |
| 4,028,208 | 6/1977 | Giacopelli | 204/252 |
| 4,064,032 | 12/1977 | Bouy et al. | 204/279 X |
| 4,273,641 | 6/1981 | Pere | 204/253 |
| 4,343,710 | 8/1982 | Shackleton et al. | 210/797 |
| 4,541,911 | 9/1985 | Burgess et al. | 204/253 |
| 4,597,862 | 7/1986 | Davis | 210/106 |
| 4,600,509 | 7/1986 | Sato | 210/230 |
| 4,623,453 | 11/1986 | Davenport | 210/230 |
| 4,664,797 | 5/1987 | Kurita | 210/225 |
| 4,668,385 | 5/1987 | Hamazaki | 210/91 |
| 4,756,817 | 7/1988 | Hicks | 204/279 X |
| 4,846,952 | 7/1989 | Gardner, Sr. et al. | 204/279 |

FOREIGN PATENT DOCUMENTS

| | | | |
|---|---|---|---|
| 664416 | 5/1965 | France | 210/231 |
| 542358 | 1/1942 | United Kingdom | 204/256 |

*Primary Examiner*—Donald R. Valentine
*Attorney, Agent, or Firm*—Bierman and Muserlian

[57] ABSTRACT

An apparatus for uniformly pressing a plurality of flat plate-type structures together comprising a first and second vertical support means, a pair of side rails spaced apart and supported on the support means, the side rails being perpendicular to the support means and adapted to support flat plate-like structures, a plurality of flat plate-like structures with hanger members to slidably and pivotably mount the structures on the side rails, a vertical mobile platen provided with top and bottom hanger members connected to a press means adapted for pressing the mobile platen against and toward the flat plate-type structures to compress them together and retracting the mobile platen from the plate-like structures, the press means comprising at least one coiled spring, a first contactor plate attached to the mobile platen and a second contactor plate attached to a positioning device secured to one of the support means and a first and second guide chamber for directing the positioning device and coiled spring perpendicularly to the face of the mobile platen and the support means useful to form a plate-type pressure apparatus useful as electrolytic cells, filter presses, injection molding apparatus and the like and a novel method of isolating plate-like structures for repair or replacement.

23 Claims, 5 Drawing Sheets

SQUEEZER APPARATUS

STATE OF THE ART

There are a variety of apparatus used for pressing plate-type structures as well as a variety of plate-type structures in different industries. For example, in the chlor-alkali industry, an apparatus referred to herein as a "squeezer apparatus" is used for compressing together a single or plurality of flat plate-type electrode frame members of the monopolar or bipolar type to form an electrolysis cell or electrolyzer for producing halogens such as chlorine and an alkali metal hydroxide such as sodium hydroxide.

In the filtration industry, a plate-type pressure apparatus is used to compress together a plurality of filter press-type frame structures for use in separating solids from a slurry or mixtures of solid and liquid by means of a permeable filter media. In the molding industry, plate-type structures are compressed or squeezed together to form a series of plate-type chambers such that a moldable fluid can be injected into the chambers to form molded products.

In any of the above processes, it has been a perpetual problem as to how to safely and efficiently maintain seals between the plate-type structures without introducting excessive compression loads that will cause the seals to be over squeezed and/or extruded out from between the plate-type structures. Another problem that has plagued the above processes is how to maintain the two end contactor means parallel to effect a uniform compression load on all of the seals.

Many attempts have been made by the industries to solve these problems, but the proposed solutions are quite complicated and some require sophistical controls. For example, U.S. Pat. No. 4,273,641 requires for each tie-rod or pull means, a device for automatically adjusting the operational copression load. Others require hydraulic compression devices with charging pumps, valves and pressure control system as in U.S. Pat. No. 3,807,567. Until now, there has been no satisfactory means of maintaining the required compression load on the whole seal system without employing sophisticated control schemes which are not always reliable and are difficult to maintain.

OBJECTS OF THE INVENTION

It is an object of the invention to provide an apparatus for pressing together plate-type structures which provides a uniform compression control, which has an instantaneous response to change in sealing requirements that can come about due to thermal and pressure cycles on the elastic gasket and which is reliable and cost effective.

It is another object of the invention to provide a novel method of isolating plate-like structures in such a pressured cell without destroying the integrity of the rest of the apparatus to repair or replace the defective isolated plate-like structures.

These and other objects and advantages of the invention will become obvious from the following detailed description.

THE INVENTION

The novel apparatus of the invention for uniformly pressing a plurality of flat plate-type structures together comprises a first and second vertical support means, a pair of side rails spaced apart and supported on the support means, the side rails being perpendicular to the support means and adapted to support flat plate-like structures, a plurality of flat plate-like structures with hanger members to slidably and pivotably mount the structures on the side rails, a vertical mobile platen provided with top and bottom hanger members connected to a press means adapted for pressing the mobile platen against and toward the flat plate-type structures to compress them tegether and retracting the mobile platen from the plate-like structures, the press means comprises at least one coiled spring, a first contactor plate attached to the mobile platen and a second contactor plate attached to a positioning device secured to one of the support means and a first and second guide chamber for directing the positioning device and coiled spring perpendicularly to the face of the mobile platen and the support means whereby the flat plate-type members are compressed together in a positive face-to-face manner.

The novel method of isolating at least one plate-like structure from the remaining plate-like structures in an apparatus as described above to maintain the integrity of the remaining compressed plate-like structures comprises clamping together the plate-like structures of the apparatus on either side of the plate-like structure to be isolated, shifting the clamped plate-like structures from the plate-like structure to be isolated, replacing or repairing the isolated plate-like structures and reclamping the plate-like structures together.

Referring now to the drawings.

Figure 4:
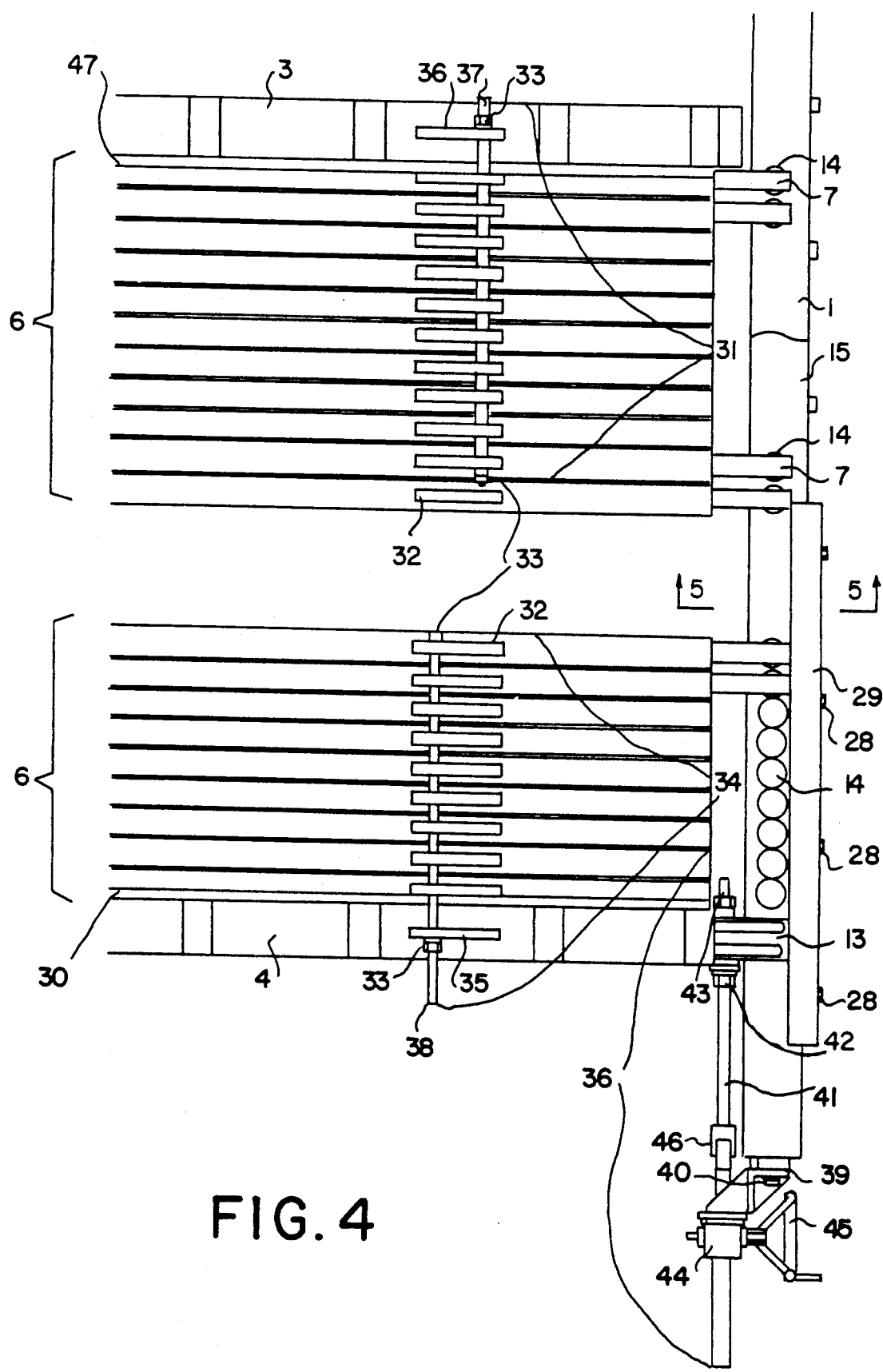

FIG. 4 is a partially exploded partial top view of a spring squeezer with electrolytic flat plate-type cell frame structures showing an embodiment of a means for clamping the stationary end support to a number of flat plate-type cell frame structures and for clamping the mobile platen to a number of flat plate-type cell frame structures and a retractor means for separating the two clamped groups to practice the method of the invention.

Figure 5:
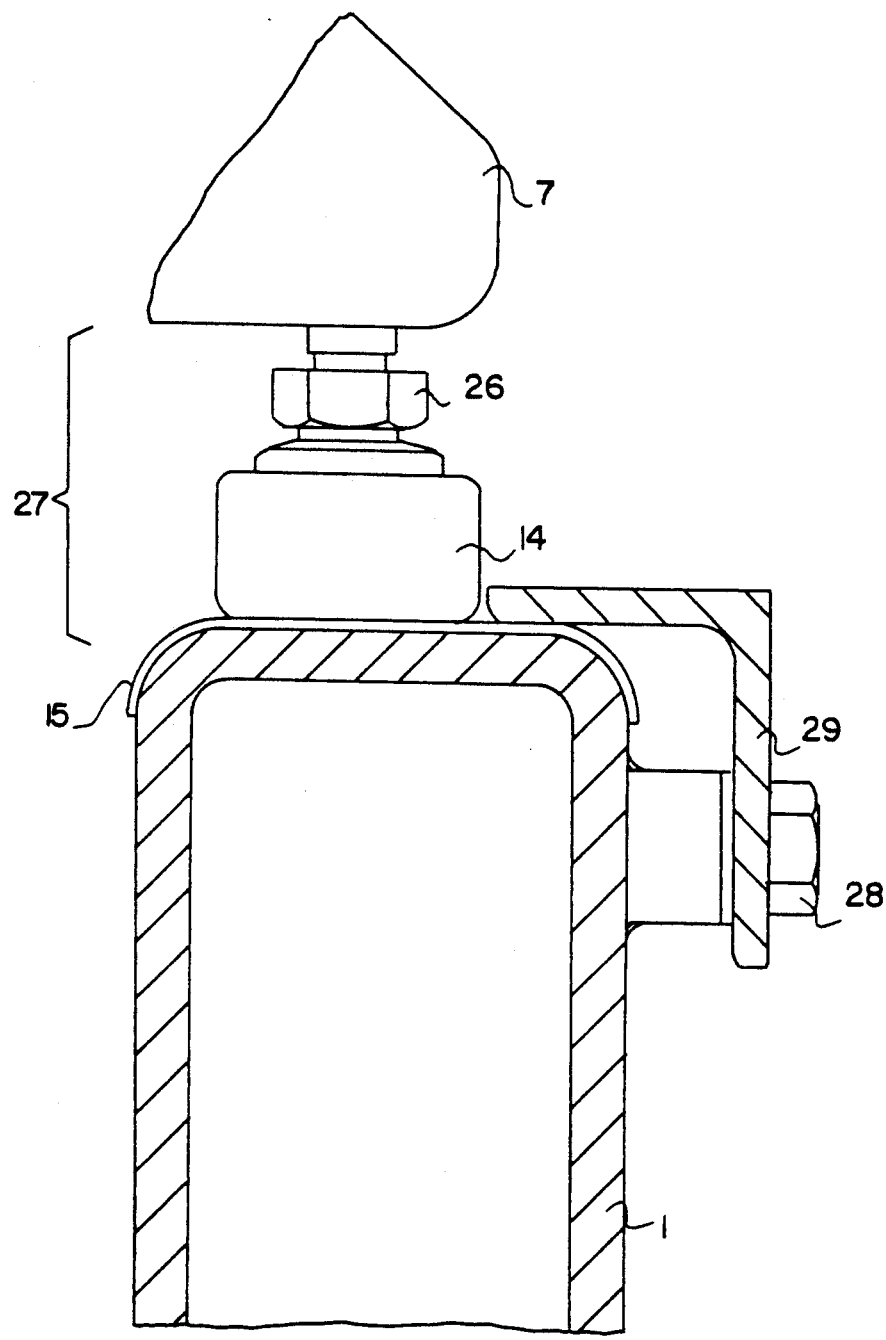

FIG. 5 is a cross-sectional view taken along line X—X of FIG. 4.

DETAILED DESCRIPTION OF THE PREFERRED EMBODIMENT

Figure 1:
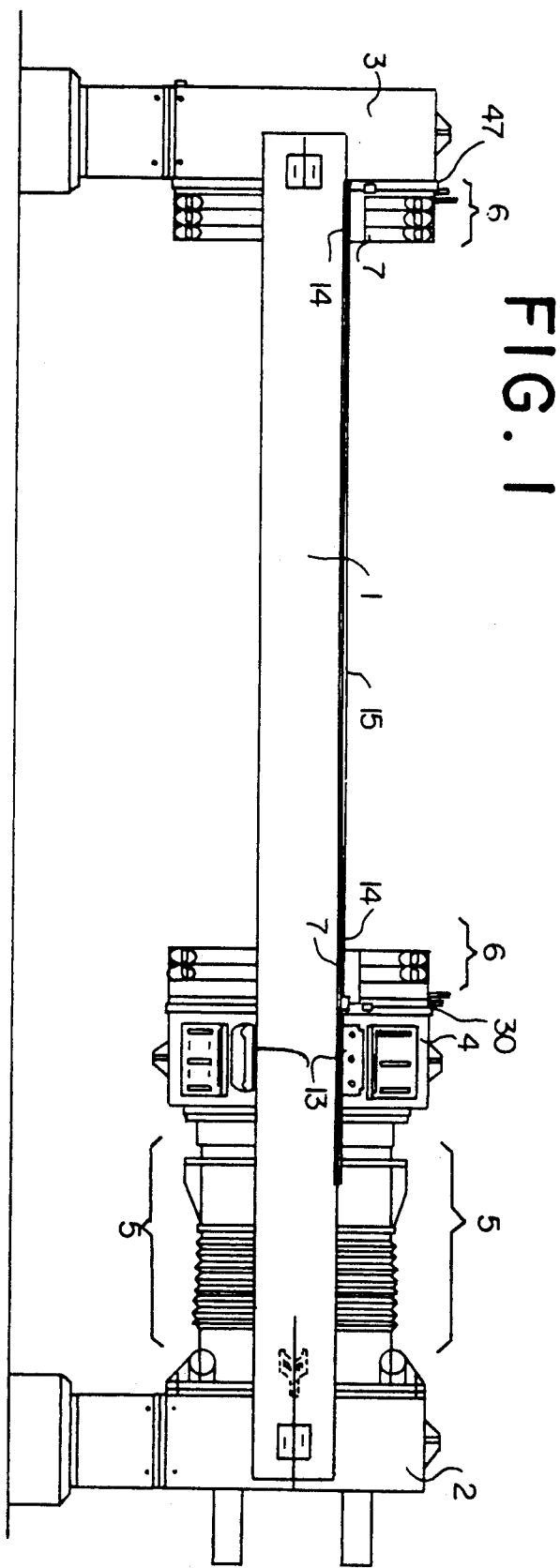
FIG. 1 is a partially exploded side view of an apparatus of the invention with a spring squeezer with an electrolytic flat plate-type cell frame structures therein.
Figure 2:
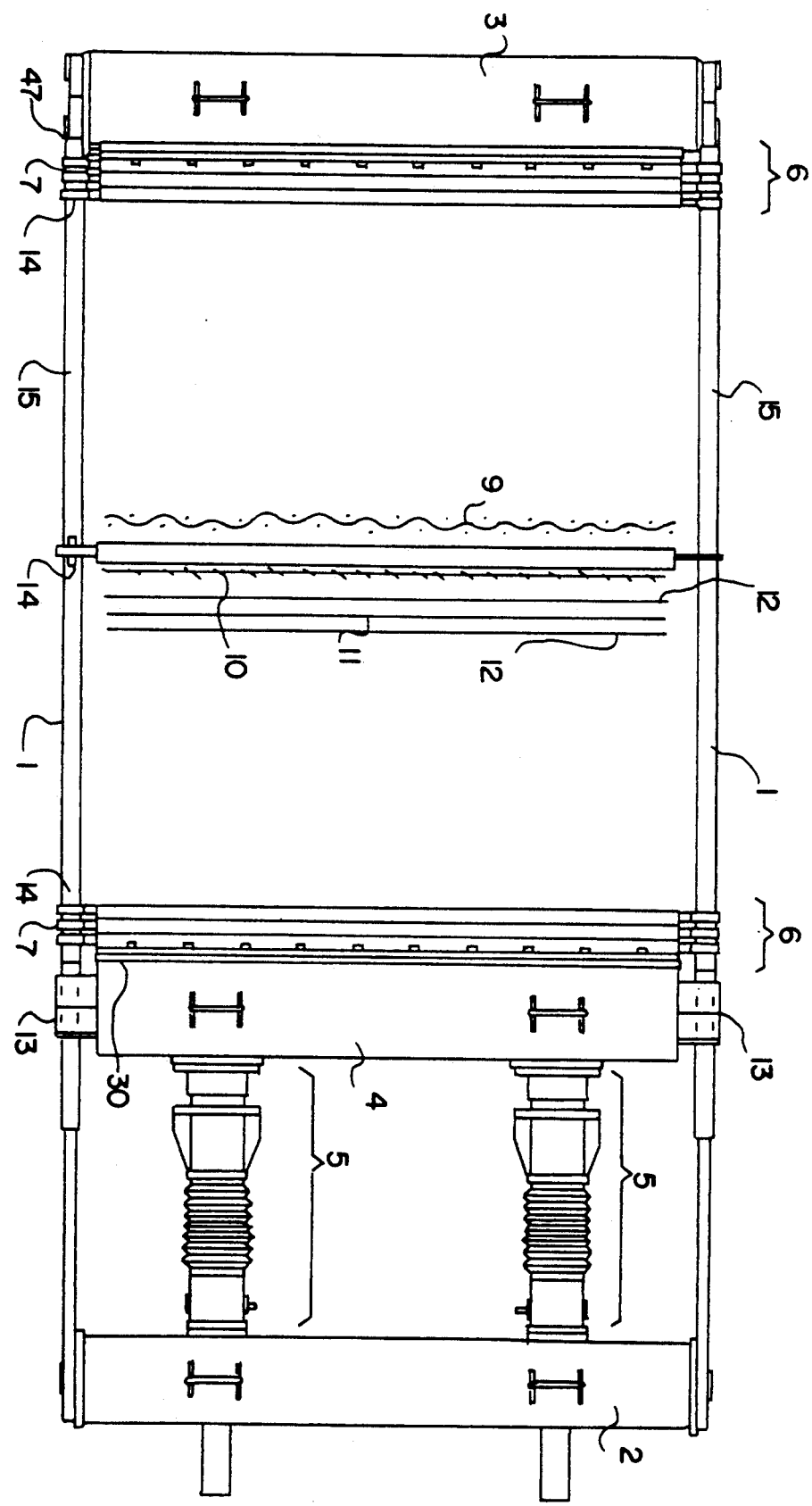
FIG. 2 is a partially exploded top view of the apparatus of FIG. 1 with a spring squeezer with electrolytic flat plate-type cell frame structures therein.

With reference to FIGS. 1 and 2, there is shown an embodiment of a spring apparatus of the present invention for compressing or pressing together at least one of generally planar or flat plate-type structures 6. The pressing apparatus described herein will be referred to as a "squeezer" or "pressing means". The squeezer, generally disposed horizontally, includes a pair of vertical support means 2 and 3, adapted as supports, for supporting a pair of horizontally aligned side bars or side rails 1 which are generally parallel to each other and spaced apart and generally perpendicular to the support means 2 and 3 at or near the ends of the side rails 1.

The side rails 1 are adapted for insulatably supporting at least one of flat plate-type structure(s) 6 which are pivotally and slidably mounted on the side rails 1 and pivotally supported or pivotally hung on the side rails 1 by supporting hangers 7. This novel approach of allowing the flat plate-type structures to be pivotally and slidably mounted allows the structures to freely seek the most desirable position within the group of flat plate-type structures by alignment with a minimal amount of resistance.

Figure 3:
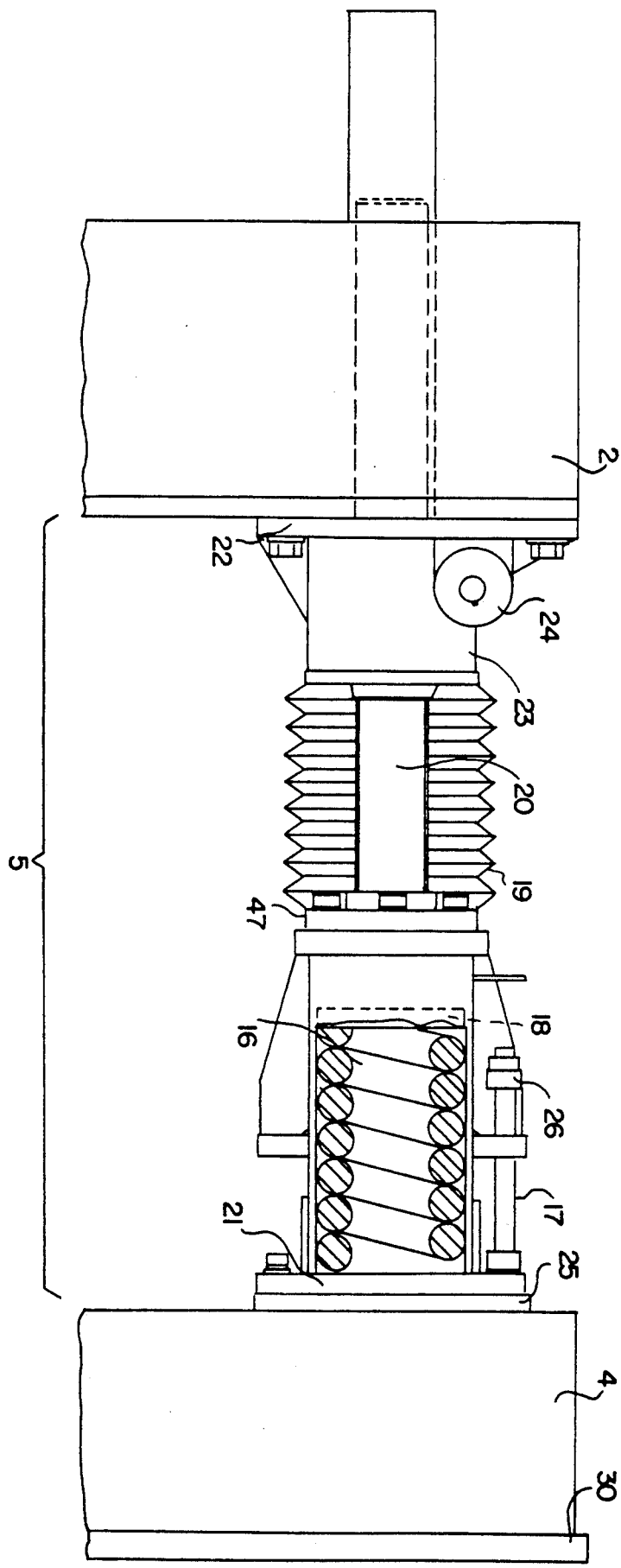
FIG. 3 is a partially exploded side view of a spring squeezing device showing one method of attachment to one of the support members and to the mobile contactor.

At least one of the support means (2 or 3) i.e., support means 2, is adapted for supporting a movable platen for pressing the flat plate-type structures 6 together. Support means 2 may be any rigid structure capable of supporting the side rails 1 and the press means 5. FIG. 3 shows one examplification which includes press means 5 secured to the support means 2 on one end and on the other end to the mobile platen 4. Support means 2 may be stationary, for example, anchored to a foundation or free-floating, for example, fixed only to the side rails 1. Support means 3 is a fixed or stationary support, for example anchored to a foundation.

A mobile platen 4 or "follower" is sidably mounted on the side rails 1 and secured to the spring forcing means 5 and the mobile platen 4 hangs or is vertically supported on the top and bottom of side rails 1 by supporting hangers 13. The top and bottom support means is critical to maintain the platen vertical to be certain that the plate-like structures are uniformly vertical during compression. The slidability of the support hangers 13 may be facilitated by interposing a lubricant means between the slide plate of the supporting hangers 13 and the top and bottom portion of the side rails 1. Lubricants can be injected into the space between the slide plate of the support hangers 13 and the top and bottom portion of the side rail 1, for example, by use of a grease fitting (not shown). In another embodiment, the slidability of the hangers 13 can be enhanced by use of, for example, ball bearings or roller bearings and the like interposed between the slide plate of the hangers 13 and the top and bottom portion of the side rail 1.

The hangers 13 may be of any desired shape or form that does not restrict the ability of the platen 4 to vertically slide on top of an along the horizontal axis of the side rail 1. The hangers 13 should be of sufficient width to effect a vertical and parallel movement of the contact surface of mobile platen 4 with respect to the contact surface of the rails on the support means 3. By maintaining the surface of mobile planten 4 in a mostly parallel ralationship to the surface of the support means 2 and 3 insures a mostly uniform compression load on the group of flat plate-type structures 6. The top and bottom hangers 13 should also be of a shape or form that does not restrict the ability of the flat plate-type structures 6 with its respective hanger 7 from moving on top of and along the horizontal axis of the side rail 1.

One embodiment for enhancing slidability and to electrically isolate the flat plate-type structures 6, for example, in electrolytic cell applications, is to attached a plastic or an electrically, non-conductive material insulation member 14 (see FIG. 5) to the slide plate of hangers 7. The insulation members 14 can be fastened to the slide plate of hangers 7 with any desired fasening means such as threaded bolts, screws and welds. The insulating members 14 are adapted for providing an electrolytic insulation means, a low friction means and a pivoting means for the electrolytic flat plate-type cell structures. The insulation members 14 must be constructed of an electrically non-conductive material such as high impact resistant plastic, for example, fiberglass reinforced Teflon(R), or of porcelain.

In addition, the side rails 1 may contain a liner material 15 (see FIG. 5) such as Teflon or some other electrically non-conductive material disposed on the top portion of the member which is in contact with the insulation member 14 for providing additional low friction means and to enhance the slidability of the flat plate-type structures 6.

To further isolate the electrolytic flat plate-type cell structures, insulating plate 30 placed on the face of mobile platen 4 and insulating plate 47 placed on the face of support means 3 are used to eliminate the passage of electrical current to the above two press means. The insulating plates 30 and 47 can be constructed from, for example, polyolefin, polyamide, polyester and vinyl ester resins with or without organic fillers, hard rubber and the such. Thickness of the insulating plates are normally in the range of 4–60 mm.

With reference to FIG. 3, there is shown an embodiment of the spring pressing means 5. The spring pressing means 5 comprises two support plates 21 and 22 for mounting to the follower or platen 4 and the support means 2. Optionally, a load cell 25 can be placed between one of the support plates 21 or 22 for monitoring the amount of pre-set load exerted on spring 16. Spring 16 is placed in position by a driver gear 24 through a mechanical driver (not shown). Driver gear 24 moves the driver rod 20 back and forth causing the spring 16 to compress or retract. Spring 16 is held in a mostly straight and horizontal position by spring guide chamber 18. It is well known in the industry that springs that are allowed to be laterally loaded can deflect considerably more than the same spring with only an axial load. Guide chamber 18 insures that the load exerted on spring 16 remains axial and therefore there is a more effective and reliable use of spring 16. In addition, guide rods 17 are provided to further stabilize the spring guide chamber 18 and the ends of guide rod 17 are threaded and include a limiter nut 26 for setting the minimum compression load on spring 16. A second limiter nut (not shown) may set the maximum compression load. To insure the position of the drive rod 20, a driver rod guide chamber 23 is provided. Driver gear 24 is mounted on the driver rod guide chamber 23 and it is at the driver gear 24 location that a portable or fixed mechanical driver is attached. A driver rod cover 19 is employed to prevent the threads (not shown) on the driver rod 20 from corroding or from becoming solid.

The apparatus of the present invention is useful for compressing and shifting at least one flat plate-type structure(s) 6 supported on side rails 1. The flat plate-type structures 6 can be, for example, of the filter-press type used in a wide variety of processes, for example, in filtering processes such as for liquid- solid separations, in molding processes, and in chloro-alkali processes. The flat plate-type structures 6 may be made of metals such as nickel, titanium, ductile iron, steel, and the like or from plastic materials such as polypropylene, Teflon, and the like. The flat plate-type structures 6 of the invention are described herein with reference to flat plate-type cell structures used in a chlor-alkali process for the production of halogen such as chlorine and an alkali metal hydroxide such as sodium hydroxide by an electrolysis, but it is understood that the invention is not intended to be limited thereto.

The flat plate-type cell structures used in the chloralkali industry are well known and described fully in the prior art such as in U.S. Pat. Nos. 4,488,946 and 4,111,779. Preferably, the type of cell frame structures used in the present invention are of the type described in U.S. Pat. Nos. 4,488,946 and 4,602,984 and the disclosures thereof are incorporated herein by reference. The cell frame structure may be monopolar or bipolar and the cell frame structures are of the flat-plate-type or filter-press type and the compressed together with a separator and gasket member interposed between two cell frame structures to form an "electrolyzer" as described generally herein below.

Again, with reference to FIGS. 1 and 2, a filter press-type electrolyzer is shown embodying the squeezer apparatus. The electrolyzer comprises a number of flat substantially vertical plate-type cell structures 6, separators 11 and gasket members 12 compressed together by the spring pressing means 5. Supporting hangers or arms 7 are attached to the flat plate-type cell structures to be pivotally mounted on the side rails 1 of the squeezer apparatus. In the production of chlorine and cautic, for example, the gaskets must be substantially inert to acid, brine, chlorine, hydrogen and caustic and the gaskets 12 are preferably electrically non-conductive. Furthermore, the gasket 12 should be of a material having high volume resistivity and good sealability after it has been compressed.

Suitable materials which can be employed in accordance with the invention include, but are not limited to, for example, neoprene, butyl rubber, ethylene-propylene diene monomer (EPDM), chlorinated polyethylene (CPE) and a polytetrafluoroethylene (PTFE) material such as GORETEX or Teflon. The durameter of these materials may range from about 50 to about 90 Shore A.

During closure of the platen 4 i.e., when the platen is pressed against the cell frame structures 6 by the spring pressing means 5, the spring pressing means 5 slowly exerts force against the first cell frame structure 6 via the platen 4 contacting the structure 6 and this force is transmitted from the first cell frame structure 6 to the adjacent cell frame structure 6 to initiate movement in all the structure 6 and to close-up any number of cell frame structures as a series to make up the electrolyzer, thus allowing liquid filling and then operation as a chlor-alkali electrolysis cell electrolyzer. The electrolyzer may be of the bipolar or monopolar cell frame type and anywhere from two to as many as several hundred flat plate-type cell fram structures 6 can be used to make up the elecrolyzer. The flat plate-type cell frame structures 6 can be any shape or size desired with respect to its intended use.

The separator 11 used in the above electrolyzer may be diaphragm- type or ion exchange membrane-type. The ion exchange membrane materials commonly used, for example, include those marketed by E. I. duPont de Nemours & Company under the trademark Nafion (R) and by Asahi Glass Company Ltd. under the trademark Flemion (R). The membranes are available principally in sheet-like form and are used for separating the cell frame structures 6 into the anode cathode electrode compartments containing electrolyte. For example, a membrane-type cell used for the production of a halogen and an alkali metal hydroxide may use an ion exchange membrane to separate the anode compartment containing anolyted and an anode electrode member 10 from the cathode compartment containing catholyte and cathode electrode member 9. The gasket members 12 are used in the electrolyzer for providing a fluid-tight i.e., liquid and gas-tight seal between the membrane and the circumferential cell frame structure 6.

The electrolyzer may comprise any number of cell frame structures 6, wherein each structure comprises an anode and a cathode compartment facing each other and an ion exchange membrane between the anode and the cathode compartment. The production capacity of such an electrolyzer can be adjusted by increasing or decreasing the number of flat plate-type cell frame structures 6 to be mounted in the electrolyzer. For operation of the electrolyzer, a series of flat plate-type electrolytic cell frame structure 6, ion-exchange membranes 11 and gasket members 12 are placed between each pair of frame structures 6 and are pivotally positioned on side rails 1 of the squeezer apparatus and compressed together.

What is surprising to one not skilled in this art is the complexity in properly applying the compressive load to these flat plate-type cell structures to maintain a uniform compressive load throughout the electrolyzer so that none of the resilient gaskets in the electrolyzer are allowed to succumb to over squeezing. For what seems to be a relatively simple assembly problem remains today one of the industries most difficult problems.

To preclude unwanted leakage of fluids and/or gas from at least one flat plate-type electrolytic cell frame structure 6, two structural aspects and one operational aspect are essential for successful operation. The first structural aspect is that the individual flat plate electrolytic cell frame structures 6 must be accurately positioned and retained relative to one another. The second structural aspect is that the overall electrolyzer should be maintained in a balanced configuration by insuring a substantially vertically disposition of each flat plate-type electrolytic cell frame structure 6. The operational aspect is that the seal load should be maintained uniformly throughout the entire surface through thermal and pressure cycles to ensure sufficient seal loading on the one hand and to eliminate the possibility of gasket flow due to overloading on the other hand. These are the spatial considerations to which the present invention is explicitly addressed.

In operation, the desired load necessary to obtain optimum compression of the gasket members 12 and the load balancing necessary between the spring pressing means 5 for parallelism of the flat plate-type electrolytic cell frame structures 6 are displayed in a conventional manner from the load cells 25. The nominal compressive stress normally used may range from about 50 pounds per square inch (PSI) to about 2000 PSI. Preferably, the normal compressive stress on the gasket members 12 ranges from about 50 PSI to about 700 PSI, but the lowest stress required for effectuating a desired joint tightness is desired for material endurance. Once these load cels 25 are preset to an operation load, the system automatically adjusts to any changes in gasket 12 thickness due to heat, age and other degradations so as to produce no change in the overall performance of the sealing means 12. The spring forcing means 5, having elastic qualities by design, absorbs the transverse expansions of the metallic components of the electrolyzer while providing rapid unloading of the gaskets 12 when they become less resistant or more resilient due to the rise in temperature that normally occurs in operating electrolytic cells as mentioned. This rapid unloading occurs when the gaskets 12 heats up and thus becomes softer allowing the electrolytic cell frames 6 to come together. This inward movement of the electrolytic cell frames 6 causes the spring apparatus 5 to elongate, thus reducing the total load to the platen 4 which in turn provides less load to the electrolytic cell elements 6 which in turn provide less load to the gaskets 12, thereby reducing or minimizing the possibility the outward expansion of the gasket 12 and reducing or minimizing the possibility of damage to separator 11.

When the electrolyzer is shut down, the reverse occurs, namely as the temperature drops in the shut down electrolyzer, the metallic components of the cell 6 retract and the gaskets 12 become less resilient, requiring a higher load to be exerted by the spring forcing means 5. Because in this instance, the electrolytic cell elements 6 are expanded outward by the increase in resistance of the rubber gaskets 12, the spring forcing means 5 is compressed more, which causes the load to increase from the forcing unit 5.

This rapid or sudden emergence and/or retraction of load provided by this novel design allows the gaskets 12 to operate with a reduced compression load and allows this compression load to be reduced, for example, considerably below the elastic limit of the gaskets 12, and thus greatly reduces the stresses on the gaskets 12 during operation, improves sealability of the electrolytic cell elements 6 and increases the life of the gaskets 12 and more importantly the life of the separator, i.e., membrane.

Fluctuations in temperature of the kind which inevitably occur during start up and shut down of the electrolyzer pose the most severe operational problems for gasket loading control. It is during these thermal cycles that the elasticity of the gasket 12 can change dramatically requiring substantial increases or decreases in gaskets loading. For example, the durometer of a conventional gasket at 30° C. may be in the range of 80 Shore A°, but at 90° C., the same gasket durometer can drop to as low as 50 Shore A° depending on the materials of construction.

With conventional hydraulic or pneumatic compression means, the load on the gaskets 12 would not be maintained unless the apparatus was equipped with automatic controls such as a computer. Such an automatic controller must first send a signal to the mechanical unit to start the addition of or removal of hydraulic or pneumatic feed to or away from the cylinder pressing means. How quickly the actuation of this system occurs can greatly affect the operation of the gasket means 12. If the system is too slow, the gasket means 12 can deform and expand outwardly or "ooze-out" of the electrolyzer elements 6. Gaps between electrolyzer elements 6, caused by gasket oozing-out, may lead to gas and or electrolyte leakage, especially in pressurized cells, requiring shutdown of the electrolytic cell elements 6.

With conventional spring compression means, the load on the electrolyzer and therefore on the gaskets is maintained by a plurality of springs plus tension rods or "pull means" located around the periphery of the electrolyzer. For small cell designs such as in U.S. Pat. No. 4,017,375, one may use pull means only on the side, therefore allowing access to the individual flat plate-type cells for maintenance purposes from the top of the electrolyzer. For larger flat plate-type cell designs such as those with widths over 2 meters and especially those that operate under pressure, it requires additional pull means located along the top and bottom sections of the electrolyzer and it is with the larger flat plate-type cell design that the full benefits of this invention can be fully appreciated. However, it should be understood that even the present invention also has operational benefits for small flat plate-type cells.

To better understand the difference in operation between an electrolyzer using a spring operated pull means and a spring guided compression means as in the present invention, a description of the operation of the spring pull means is necessary. In a spring operated pull means as in U.S. Pat. No. 3,875,040, the flat plate-type cells are assembled between two free standing end plates which end plates are equipped with a plurality of holding or attachment means around their periphery for the placement of their respective pull means. When the system is assembled, the first problem that can be encountered with this design is how to effect maintenance on the electrolyzer due to the interference of the pull means. The second, but not so obvious, problem and the most severe problem lies with the function of the system during thermal cycles that are encountered during operation. As described, the pull means cooperate in a peripheral manner to individually interconnect each flat plate-type cell, gasket and separator with the adjacent flat plate-type cell. As long as each flat plate-type cell and respective gasket remain geometrically equal through the thermal cycles, the said system will work quite effectively. However in most instances it is quite difficult to obtain and maintain this requirement.

It can be understood that, for example, an electrolyzer having gaskets with variable degrees of hardness for example, small changes in overall hardness can change dramatically the requirements for sealing pressure. For example, if a gasket has a difference in hardness such that the upper most half is softer than the bottom most half, the two end plates will tend to tilt in causing the end plates to deviate from their parallel relationship to each other. When this phenomenon occurs, the gaskets will tend to ooze out, the non-parallel plates tend to exert a lateral load on the gasket which along with over squeezing of the top softer portions of the gasket and the under-squeezing of the bottom harder gaskets tends to accentuate the emission of the gasket from between the flat plate-type cell structures.

Another problem that exists with the prior art is that the top section of the gasket is allowed to receive more compressive load than the bottom section and this phenomenon is the result of the method used to support the individual flat plate-type cell structures. Since the industry supports the individual flat plate-type cell structures from the bottom, the squeezing means encounters an added load in this area that must be overcome during closure and operation. This unbalanced load causes the individual flat plate-type cell structures along with the two end plates to tilt in resulting in non-parallel planes to exist between the structural parts of the electrolyzer which in turn causes the top section of the gasket to receive more compression load than the bottom section of the gasket, resulting in the possibility of the gaskets oozing out from between the flat plate-type cell structures.

As the gaskets 12 deform outwardly, certain separators 11 which are in contact with the gaskets 12 tend to stretch when they are pulled under the pressure of the outwardly deforming gaskets. The stretching of the separator 11 by gasket deformation can cause the separator 11, which is typically a flat, thin, sheet-like membrane, to break or tear during compression of the gaskets 12 and the flat plate-type electrolytic cell frame structures 6.

In the present invention, the above problem is minimized because the support means 7 for the flat plate-type cell structure and the support means 13 for the mobile platen 4 are more centrally located thereby centrally locating the friction load. This approach greatly reduces or minimizes the negative effects of the friction load with regard to the planar movement of the individual flat plate-type cell structures and thereby reduces or minimizes any influence on the seal between the individual flat plate-type cell structures.

Any tears or breaks in the separator 11 employed in an electrolyzer may lead to reduced current efficiency during operation of the electrolyzer, greatly increasing electrical current usage while reducing the electrolytic operating efficiency of the electrolyzer. Too great a drop in current efficiency and/or electrolytic operating efficiency can require costly shutdown of the entire electrolyzer while the damaged separator(s) 11 are replaced.

Furthermore, it is extremely awkward and difficult to manipulate large, high flat-plate-type cell structures in a filter press apparatus using pull means as the squeezing means. Therefore, the height and width of the flat plate-type cell structures are limited by practical limitations to allow operators to perform the necessary functions to maintain good operation and maintenance.

It is desirous to prolong the service life of the membrane by providing a squeezer means which minimizes stretching of and/or damage to the separators 11 by the movement, deformation or oozing-out of the gasket means 12 and thus, minimize production stoppages. Furthermore, elimination of gas and electrolyte leakage is desirous as such leakages may cause a safety hazard.

To effect the shifting of the flat plate-type structures 6 within the squeezer, a means for fixing the position of any number of the flat plate-type structures 6 is required. For example, in FIG. 4, a first clamping means 31 is used to clamp at least one plate-type structure 6 to a stationary means (not shown) separate and independent from the squeezer apparatus or to a stationary portion of the squeezer apparatus. Then, any number of the remaining structures not clamped by the first clamping means can be clamped together.

In FIG. 4, a plurality of flat plate-type structures 6 are shown fixed to the stationary platen 3 by a first clamping means 31 described herein below. The remaining flat plate-type structures not clamped by the first clamping means 31 can be clamped together or clamped to the mobile platen 4 by a second clamping means 34. Preferably, the remaining structures 6 are clamped, together, by clamping means 34 so that when the mobile platen 4 is retracted, the structures 6 move as one unit. Once the structures 6 clamped by the second clamping means 34 have been shifted and split apart from the structures 6 clamped by the first clamping means 31 to a desired gap, the desired flat plate-type structure 6 or its internal parts can be removed and inspected. After the internal parts or structure are repaired and/or replaced, the flat plate-type structures 6 are recompressed by actuating the spring-forcing unit 5 and moving the mobile platen 4 against the flat plate-type structures 6.

As the flat plate-type structures 6 are pressed together with the spring forcing unit 5, the structures 6 ride on top of their respective slider member 27 until initial contact between structures at the separation joint is achieved. The guide means 29 is then removed from side rails 1 and thereafter, the spring forcing unit 5 is again actuated to compress the flat plate-type structures 6 to a determined gasket pressure. During this final movement, structure hangers 7 slide axially with their respective slider members 27 on top of the secondary slider member 15. The interface between the slider member 27 and the top surface of sider member 15 must possess a low friction factor or the gasket loading will vary between the flat plate-type structures 6.

With reference to FIG. 4, there is shown an embodiment of the retraction means 36 for retracting at least one flat plate-type structure(s) 6 in place during the shifting operation. At least one flat plate-type structure(s) 6 can be fixed in position and clamped to the platen 3 by the first clamping means 31. The clamping means comprises a support plate 36 mounted on the stationary platen 3, a tie-rod 37 with threaded ends, and retaining nuts 33.

Any number of clamping means 31 can be used, preferably, on top and bottom of the flat plate-type structures 6 and platen 3 (not shown in FIG. 4). The proper placement and torquing of the restraint members or clamping means 31 is necessary to prevent liquid leakage from the flat plate-type structures 6 prior to removing the compressive force exerted by the pressing apparatus 5.

The second clamping means 34 is used for holding at least one plate-type structure(s) 6 together during the shifting operation without attaching the structures to any fixed object. In one embodiment, clamping means 34 is removably attached to the mobile platen 4 and used for clamping together at least one flat plate-type structure (6) to the mobile platen 4. In another embodiment, the clamping means 34 is used for clamping together at least one flat plate-type structure(s) together without the mobile platen 4 as shown in FIG. 4.

The clamping means 34 comprising a tie-rod 38 with threaded ends and nuts 33 is removably attached to the reinforcing memeber 32 which in turn is attached to support plate 6. Any number of structures can be tied together by using one or more clamping means 34 removably mounted on one or more flat plate-type structures 6. Preferably, the clamping means 34 are used on top and bottom of the structures (not shown in FIG. 4). The proper placement and torquing of the restraint members of clamping means 34 is necessary to prevent leakage from the flat plate-type structures 6 prior to removing the compressive force exerted by the pressing means 5.

After the first clamping means 31 and the secondary clamping means 34 have been attached, the retraction means 36 can be attached to the hanger support means 13 of the mobile platen 4. The retraction means 36 comprises a support plate 39 mounted to the end of the side rail 1 with bolts and a tie-rod 41 with threaded ends is attached to the hanger support means 13 by nuts 42 and 43. A gear drive 44 engages the other threaded end of tie-rod 41. Pictured in FIG. 4 is a hand operated gear wheel 45 that can be manually activated to retract the group of flat plate-type cell structures 6 attached to the mobile platen 4. Optionally, an alternate mechanical power system can be provided. To facilitate alignment, an optional universal joint 46 can be employed between the two threaded ends of tie-rod 41.

Another preferred method for retraction of a single or plurality of flat plate-type structures 6 is to use the spring forcing unit 5 shown in FIGS. 1, 2 and 3. The mechanical positioning device of spring squeezer unit 5 can also provide the pulling force to retract the group of flat plate-type cells 6 attached to the mobile platen 4. In this case, the guide rods 17 shown in FIG. 3 are locked into position by the positioning nuts 26. In this manner, when the gear unit 24 is activated by a manual or mechanical means (not shown), the guide rods 17 provide the tension means for retracting the mobile platen 4. The same method for attaching the group of cells to the mobile platen 4 described above can be used.

Various modifications of the apparatus and method of the invention may be made without departing from the spirit or scope thereof and it is to be understood that the invention is intended to be limited only as defined in the appended claims.

What we claim is:

1. An apparatus for uniformly pressing a plurality of flat plate-type structures together comprising a first and second vertical support means, a pair of side rails spaced apart and supported on the support means, the side rails being perpendicular to the support means and adapted to support flat plate-like structures, a plurality of flat plate-like structures with hanger members to slidably and pivotably mount the structures on the side rails, a vertical mobile platen provided with top and bottom hanger guide members connected to a press means adapted for pressing the mobile platen against and toward the flat plate-type structures to compress them together and retracting the mobile platen from the plate-like structures, the press means comprising at least one coiled spring, a first contactor plate attached to the mobile platen and a second contactor plate attached to a positioning device secured to one of the support means and a first and second guide chamber for directing the positioning device and coiled spring perpendicularly to the face of the mobile platen and the support means.

2. The apparatus of claim 1 wherein one of the two support means is a stationary platen.

3. The apparatus of claim 2 wherein the improvement includes at least one first clamping means for releaseably clamping at least one plate-type structure to a stationary support means.

4. The apparatus of claim 2 wherein the improvement includes at least one second means for clamping at least one of the plate-type structures to the mobile platen.

5. The apparatus of claim 2 wherein a manual or mechanically driven retractor 36 is attached to the side rails and the mobile platen.

6. The apparatus of claim 5 wherein the retractors are driven by a single centrally located mechanical driven retractor.

7. The apparatus of claim 1 wherein the mobile platen includes rollers arranged between the hanger guide members and the side rails to reduce the friction load.

8. The apparatus of claim 1 wherein the upper surface of the side rails include a plastic film to reduce the friction load of the plate-type elements.

9. The apparatus of claim 4 wherein the plastic film material is made of polyvinyl difluoride.

10. The apparatus of claim 1 wherein the plate-type elements incudes a plastic or porcelain means 24 attached to the lower portion of their respective hanger members to improve the electrical insulation and slidability and pivotability.

11. The apparatus of claim 10 wherein the film material is porcelain.

12. The apparatus of claim 1 wherein a load indicator 25 is included between the contactor plate of the press means and either the mobile platen or one of the support means.

13. The apparatus of claim 1 wherein a mechanical or manual drive means is attached to at least one of the pressing means for adjusting the compression of the coiled spring.

14. The apparatus of claim 13 wherein the drive means is a remote-controlled mechanical means.

15. The apparatus of claim 14 wherein the drive means are simultaneously controlled from a central control panel.

16. The apparatus of claim 1 wherein the press means includes an additional guide and limiter rod attached to the outside of the spring guide chamber to aid in the alignment of the coiled spring and to set the maximum and minimum compression loads on the coiled spring.

17. The apparatus of claim 16 wherein the press means with limiter rod are used as the retractor means.

18. The apparatus of claim 1 wherein the coiled spring can have a linear or exponential force characteristic.

19. The apparatus of claim 1 wherein the mobile platen contains an electrically non-conductive insulation material for electrically insulating the mobile platen from the plate-type structures.

20. The apparatus of claim 19 wherein the plate-type structures are chlor-alkali electrolytic cell frame structures.

21. The apparatus of claim 1 wherein the support means against which the plate-type structure is compressed has disposed on its contact surface an electrically non-conductive insulation material for electrically insulating the support means from the plate-type structures.

22. The apparatus of claim 1 wherein the plate-type structure is an electrolytic cell frame member useful in electrolysis process.

23. The apparatus of claim 1 wherein resilient electrically non-conductive gasket seals are placed between adjacent plate-like structures.

* * * * *